United States Patent [19]

Lee

[11] 4,362,056
[45] Dec. 7, 1982

[54] DIGITAL INDICATING SYSTEM FOR FUEL QUANTITY OF A VEHICLE OR THE LIKE

[76] Inventor: Cheng-Shun Lee, 124, Po Ai Rd., Tao Yaun City, Taiwan

[21] Appl. No.: 211,912

[22] Filed: Dec. 1, 1980

[51] Int. Cl.³ .......................................... G01F 23/10
[52] U.S. Cl. .................................. 73/317; 340/347 P
[58] Field of Search ............. 73/317, 313, 519, 290 R, 73/301, 308; 340/347 P; 116/312, 314

[56] References Cited

U.S. PATENT DOCUMENTS

| | | | |
|---|---|---|---|
| 3,339,413 | 9/1967 | Taylor | 73/317 |
| 3,459,262 | 8/1969 | Powell | 116/312 |
| 3,953,847 | 4/1976 | Younkin | 340/347 P |
| 4,102,191 | 7/1978 | Harris | 73/308 |

FOREIGN PATENT DOCUMENTS 2426085 12/1975 Fed. Rep. of Germany ... 340/347 P
383052 12/1964 Switzerland ........................ 116/312

*Primary Examiner*—E. R. Kazenske
*Assistant Examiner*—Denis E. Corr
*Attorney, Agent, or Firm*—Shoemaker and Mattare

[57] ABSTRACT

A digital system for indicating the quantity of fuel in a vehicle comprises a signal detecting device and a digital displaying device. Fuel which remains in a fuel tank of the vehicle or fuel which is consumed in the running of the vehicle is measured by the detecting device, and a signal of the detecting device is introduced into the displaying device for indication in a digital manner.

11 Claims, 3 Drawing Figures

DIGITAL INDICATING SYSTEM FOR FUEL QUANTITY OF A VEHICLE OR THE LIKE

FIELD OF THE INVENTION

The present invention relates generally to an indicating system of liquid quantity, and, more particularly, to a digital indicating system for fuel quantity of a vehicle or the like. The fuel quantity in a fuel tank of the vehicle is displayed accurately in a digital manner via the indicating system in accordance with the present invention.

A display means can be mounted on the meter panel of the vehicle so the driver can read the displayed digital numbers to directly identify the exact quantity of fuel remaining in the tank of the vehicle.

BACKGROUND OF THE INVENTION

In any vehicle, a fuel meter is a necessary instrument for indicating fuel quantity. A driver can thus estimate the distance which the remaining fuel can accommodate and what time additional fuel should be supplied.

There are several types of fuel indicators embodied in the prior art. Examples of such prior art include serial coils, parallel coils and electro-thermo couples types, and these known fuel indicators require a rheostat or an electro-thermo couple which is actuated by a floating element placed in a fuel tank, and the rheostat or the electro-thermo couple operates a pointer for inclination to indicate roughly at "F", "E", "$\frac{1}{4}$", "$\frac{1}{2}$" or "$\frac{3}{4}$" position printed on a fuel meter.

At least the following drawbacks are presented by the conventional fuel meters:

A. The pointer of the fuel meter indicates roughly "F", "E", "$\frac{1}{4}$", "$\frac{1}{2}$" or "$\frac{3}{4}$". Thus, the correct fuel quantity remaining in the fuel tank is not accurately indicated.

B. Since the pointer type fuel meter is not a precision indicator, a viewing error is caused by different angles and distances from the driver's eyes to the fuel meter.

C. After vehicle start-up, time is required for the pointer to settle into a normal position.

D. A driver cannot measure the correct fuel consumption or quantity of fuel remaining in the tank since a ratio of the fuel consumption and the declining angle of the pointer is not linear or constant.

E. The driver cannot set a predetermined fuel quantity which reaches a predetermined capacity of the fuel tank. Therefore, there is no way of knowing if fuel is overflowing from the fuel tank during filling thereof, such as when the fuel input is exceeding the maximum capacity of the fuel tank, and the filling gun is not an automatic shut-off type.

F. Prior art fuel indicating systems include rheostats or electro-thermo couples, and such elements are costly since some contact parts should include costly metal such as platinum or platinum alloy. Moreover, these components may malfunction due to heating, oxidation and bed contact.

G. It is difficult for a driver to find out the cause of an unreasonable consumption of fuel if this fuel consumption is caused by leakage. Thus, energy is wasted as the indicating mechanisms of prior art fuel meters are only brief and not precise.

SUMMARY OF THE INVENTION

The primary object of the present invention is to provide a digital indicating system which can be useful for precisely indicating the fuel quantity contained in a fuel tank of a vehicle.

Another object of the present invention is to provide a digital indicating system specially adapted for use in automobiles and other vehicles powered by liquid fuel. The fuel consumed as well as the quantity of fuel remaining in a fuel tank can be shown by digital means so the driver can be directly apprised of fuel condition.

A further object of the present invention is to provide a fuel quantity digital indicating system to assist a driver in the operation of a vehicle.

A still further object of the present invention is to provide a liquid quantity digital indicating system which is adaptable to indicate liquid quantity parameters in water towers, petroleum reservoirs, etc.

These together with other objects and advantages which will become subsequently apparent reside in the details of construction and operation as more fully hereinafter described and claimed, reference being had to the accompanying drawings forming a part thereof, wherein like numerals refer to like parts throughout, and in which:

DETAILED DESCRIPTION OF THE INVENTION

Figure 1:
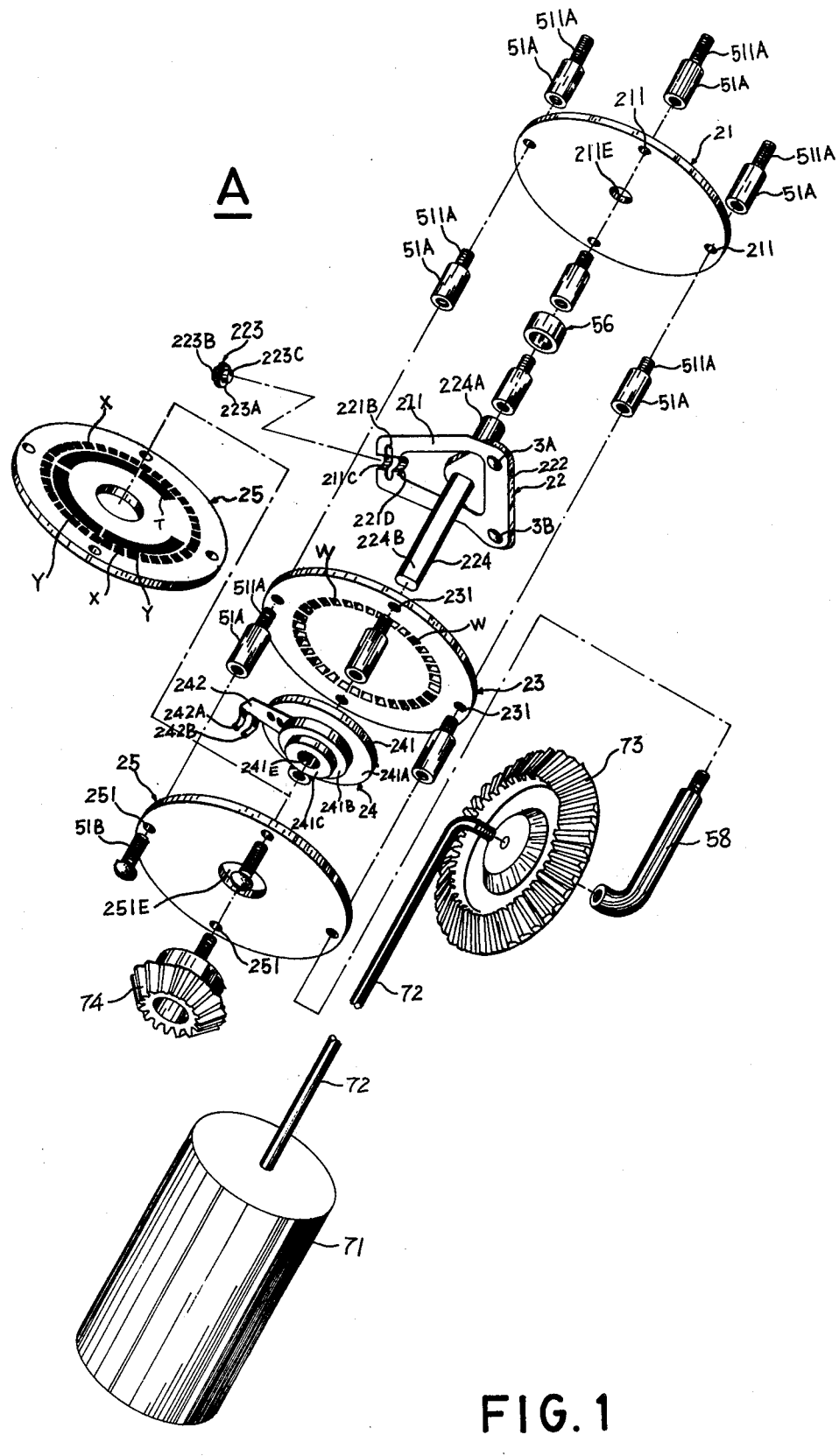
FIG. 1 is a perspective view of each component included in a signal detecting device of the digital indicating system for fuel quantity of a vehicle according to the present invention.
Figure 2:
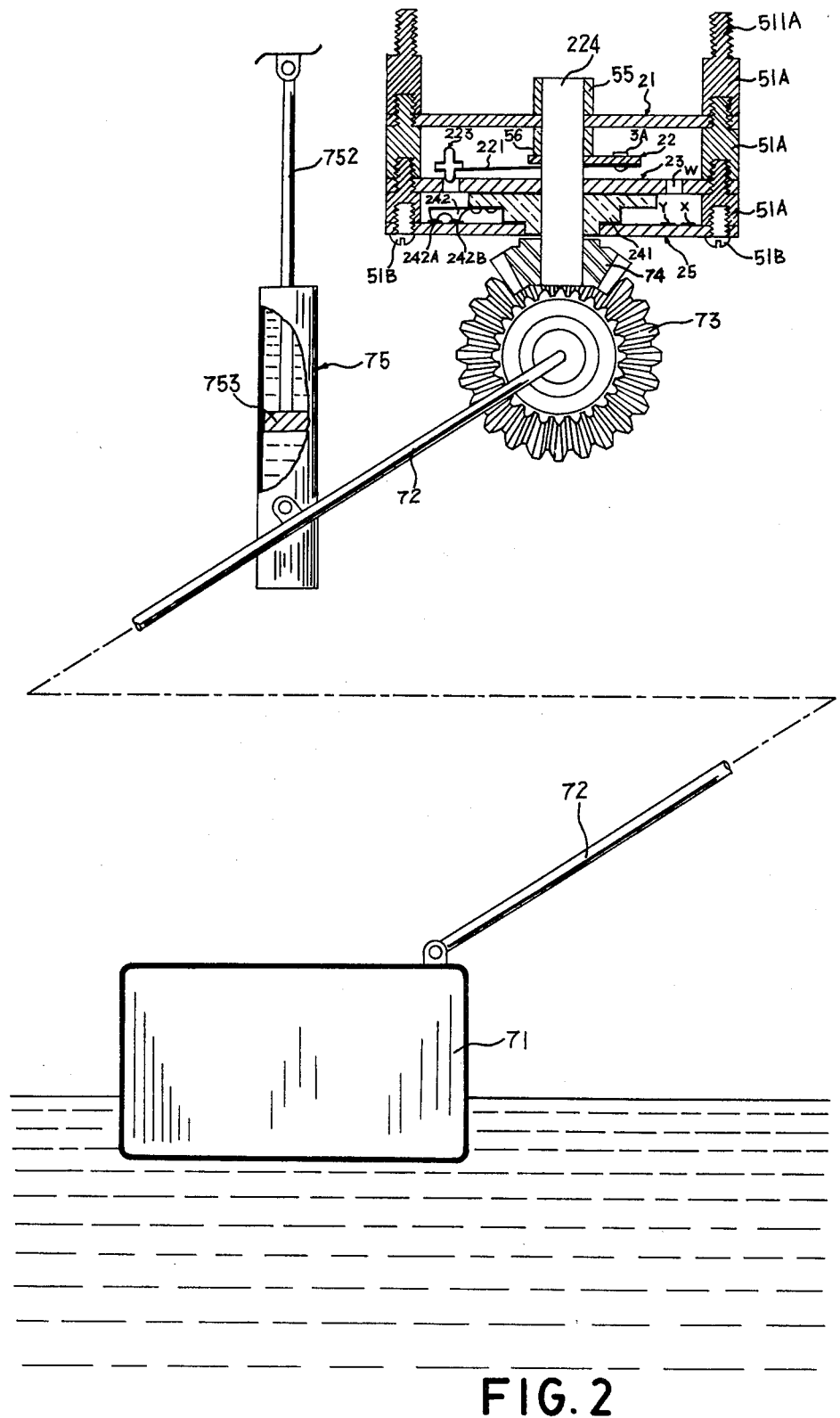
FIG. 2 is a sectional view of a combination of the components as shown in FIG. 1 of the signal detecting device.
Figure 3:
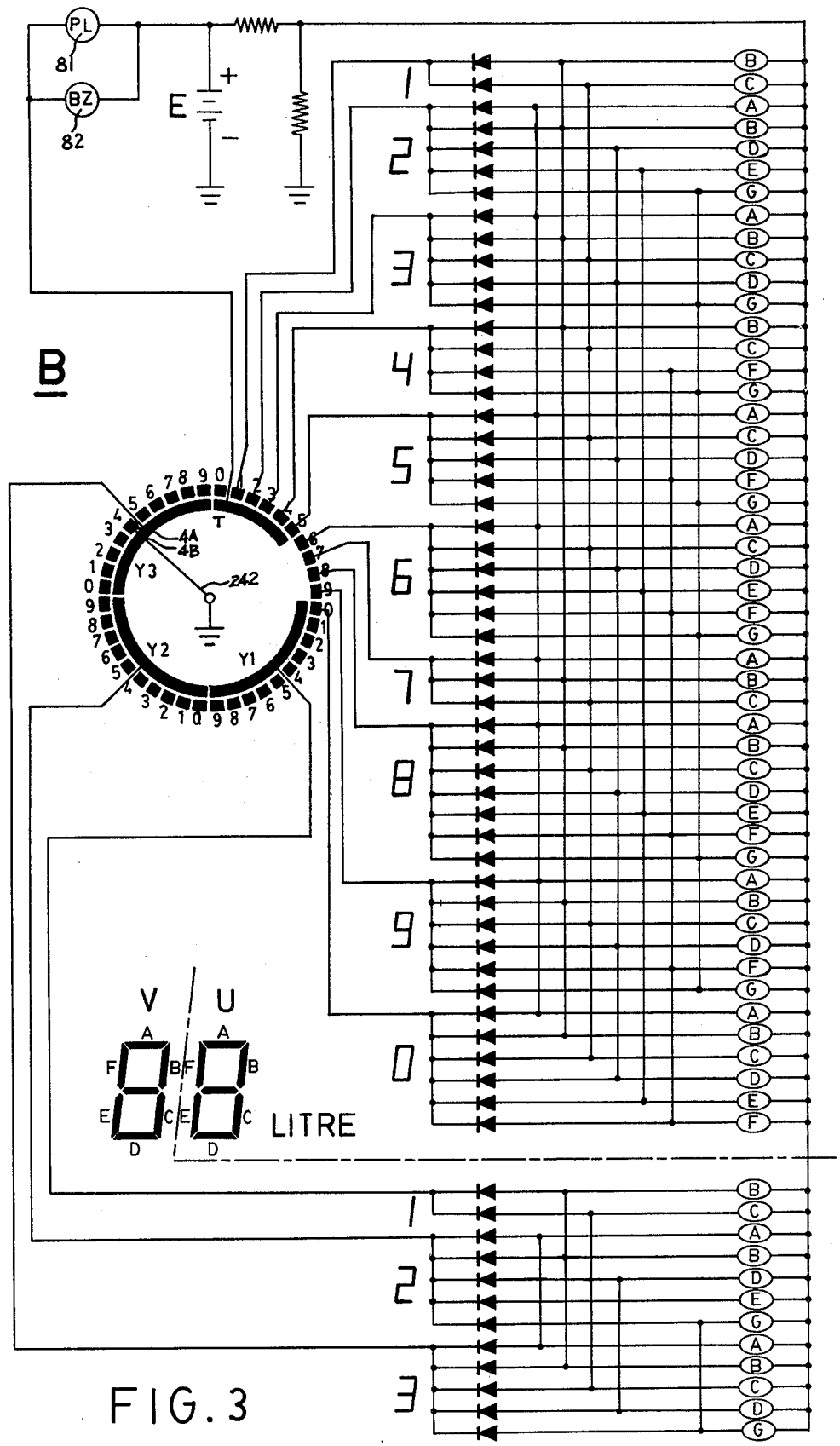
FIG. 3 is a schematic wiring diagram of a digital display device of the digital indicating system for fuel quantity of a vehicle according to the present invention.

As shown in FIGS. 1 to 3, the digital indicating system for fuel quantity of vehicles or the like in accordance with the present invention includes a signal detecting device A, and a digital displaying device B. Referring first to FIGS. 1 and 2, which show separate components and an assembled signal detecting device A, the signal detecting device A includes a first ring-shaped metal plate 21, a spring assembly 22, a second ring-shaped metal plate 23, a contacting assembly 24, a circle insulating plate 25, a plurality of fasteners 51A, two sleeves 55, 56, a float body 71, a lever 72 and two bevel gears 73, 74. The first ring-shaped plate 21 is made of a thin metal material, and has a plurality of openings 211—211 and a larger opening 211E defined respectively at circumference and central portions. The spring assembly 22 has a trapezoid-like spring element 221, a triangular metal plate 222, a roller element 223 and a longitudinal bar 224. The spring element 221 and the metal plate 222 have central openings, and a section of an upper portion 224A of the bar 224 is cylindrical in form and a section of a bottom portion 224B of the bar 224 is ellipsoid-like in form. The upper portion 224A of the bar 224 passes through two central openings 221A, 222B of the spring element 221 and the metal plate 222. In addition, the bar 224 is fixed to the circumference of the opening 222 by welding or other suitable means. Therefore, the metal plate 222 with the spring element 221 are lapped and fixed on top surface of the bottom portion 224B of the bar 224. The spring element 221 is formed by a trapezoid-like metal material having suitable elasticity, and the spring element 221 is fixedly attached to the bottom side of the metal plate 221 via two fasteners, such as rivets 3A, 3B at the small side of the trapezoid-like spring element 221 to provide an ellipsoid-like slot 221B for receiving the roller element 223. A shaft 223A is fixed transversely to the center of the roller 223, and two ends 223B and 223C of the shaft 223A are respectively extended from the roller 223 and placed respectively on bottom surfaces of two U-like supports 221C, 221D formed at two sides of the said slot 221B, so that the bottom portion of the roller 223 is extended from the bottom surface of the spring element 221. The spring assembly 22 is thus completely described.

The second ring-shaped metal plate 23 includes a plurality of square openings W which are arranged one-by-one in a circle configuration, and there are a quantity of the square openings and a gap between each two openings W—W. The size of each gap is determined according to the specification of a fuel tank. For example, if the maximum capacity of a fuel tank is 40 liters, and the tank is rectangular, then there should be 40 openings W and the gaps between each two openings W—W should be equal; whereas, if the capacity of a fuel tank is 30 liters and the configuration thereof is irregular, then the quantity of the square openings W should be designed in 30 units and gaps between each two openings W—W should be determined depending upon test results. A plurality of openings 231 and one larger opening 231E are provided respectively at the circumference and at the center of the metal plate 23.

The contacting assembly 24 includes a T-like metal body 241 and a contacting means 242. The T-like metal body 241 is integral and includes one disc-like and two extrusive portions 241A, 241B, 241C. The contacting means 242 has two contactors 242A, 242B and the contacting means 242 is fixed to bottom surface of the disc-like portion 241A of the T-like metal body 241; therefore, the contactors 242A, 242B extend from the conference of the disc-like portion 241A. An opening 241E is provided at the central portion of the body 241, and the configuration of the opening 241E corresponds to that of the section of the under portion 224B of the bar 224.

The circle insulating plate 25 includes a plurality of small metal plates X—X and metal plates Y—Y; openings 251 and a larger opening 251E are respectively provided at circumference and central portion of the plate 25. The plates X—X and Y—Y are made of thin metal material. The plates X—X are distributed in a circle configuration, and the size of all small plates X—X and the size of the gaps between the plates X—X are respectively the same as the size and gap sizes associated with the openings W—W of the said second metal plate 23. In addition, the inner and outer diameters of the circle-arranged small plates X—X are also the same as that of the circle-arranged openings W—W of the second plate 23. Each of the plates Y—Y are positioned at relative places of the small plates X—X, with the length of each arch plate Y being equal to that of ten small plates X, that is, one arch plate Y is substantially composed of ten small plates X. Moreover, the gaps between each two arch plates Y—Y are respectively the same as the gaps between each two small plates X—X except for the gap between the opposite ends of the first and the last plates.

The diameter of the first extrusive portion 241B of the T-like body 24 is slightly smaller than the diameter of the central opening 251E of the insulating plate 25. In addition, this diameter is respectively larger and smaller than the diameters of the second extrusive and the disc-like portions 241C and 241A. Therefore, the first extrusive portion 241B of the body 24 is inserted into the central opening 251E of the insulating plate 25, and, simultaneously, both contactors 242A, 242B are respectively contacted on one of the small and arch plates X—X and Y—Y. There are a plurality of openings 251 formed respectively at the circumference of the insulating plate 25.

The sleeve 56 is attached to the upper portion 224A of the bar 224 and positioned on the upper surface of the triangular plate 222, and the top portion of the bar 22 is extended into the sleeve 55 through the central opening 211E of the first ring-shaped plate 21 and housed loosely within the sleeve 55 mounted on the central portion of the plate 21. Four fasteners 51A each having an extrusive portion 511A formed in male threads thereon are respectively joined together and pass through openings 211, 231 and 251 of the first ring-shaped plate 22 as well as the insulating plate 25. Four bolts 51B are screwed onto the fasteners 51A. The upper portion 224A of the bar 224 is passed through the sleeve 56 and the central opening 211E of the first plate 21, and the top of the upper portion 224A is loosely housed within the sleeve 55 as mentioned hereinbefore. In this configuration, the roller element 223 is entrapped within one of the square openings W of the second plate 23 and the bottom of the roller 223 extends from the bottom surface of the plate 23.

The bottom portion 224B of the bar 224 penetrates the central portion of the T-like body 241, the first extrusive portion 241B is received in the central opening 251E of the insulating plate 25, and the fasteners 51A are positioned between the first plate 21 and the insulating plate 25. Thus, contactors 252A, 242B of the spring assembly 24 respectively contact one of the small arch plates X and Y.

In summary, after the first plate is mounted on the insulating plate 25, the trapezoid-like spring element 221 is fixed to the triangular plate 222, the cylindrical upper portion 224A of the bar 224 is passed through the central openings 231E, 211E of the second and the first plates 23, 21 and then into the sleeve 55, the lower portion 224B of the bar 224 is passed through the central ellipsoid-like opening 241E of the T-like body 24, and the first extrusive portion 241B is inserted into the central opening 251E of the insulating plate 25. Therefore, the roller 223 and two contactors 242A, 242B will be trapped and contact, in a step-like manner, the square openings W and small plates X as well as the arch plate Y following a rotation of the bar 224.

The two bevel gears 74, 75 are arranged to form a right angle, and are meshed, the first bevel gear 73 is connected to the float body 71 via the lever 72, and the second bevel gear 74 is fixed to the bottom end of the bar 224. Therefore, a floating motion caused by the buoyancy of fuel or the like contained in a tank will cause rotation of the second bevel gear 74 via a transmission of the lever 72 and this rotation will cause rotation of the first bevel gear 73. A cushion means 75, for example, a dash-pot, can be connected to the lever 72 so that when the float body 71 is floating, a sleeve housing 751 of the cushion means 75 will be actuated in longitudinal motion. Movement of the lever 72 is thus controlled by a piston 753 housed within the housing 751, and two ends of a rod 752 which are respectively fixed to the piston 753 and the surface of the fuel tank.

Attention is now directed to FIG. 3, which shows the digital display device B according to the present invention. The display device B includes a plurality of LED elements a, b, c, d, e, f and g, which include a unit "U" and decimal number "V" of two figures. Ten small plates given by Nos. $X_1$-$X_{10}$ are connected respectively to the elements associated with "0"-"9" of the LED elements a-g for a unit display and some of the arch plates, for example, three arch plates $Y_1$-$Y_3$ are connected to the elements associated with "1" to "3" of the remaining LED elements a-g for the display of the decimal number.

During filling, the float body 71 is lifted by the buoyancy of fuel, and the bar 224 will be rotated in a clockwise direction via the transmission of the float body 71, the lever 72 and the first and second bevel gears 73, 74. The contactors 242A, 242B and the roller 223 are respectively run on small and arch plates X, Y as well as square openings W of the second and the insulating plates 23 and 25 by said movement of the float.

As an example of the above-discussed device, assume that 34 liters are to be ingested into a fuel tank and the fuel tank is empty prior to such filling. After the 34 liters of fuel are ingested, the roller 223 is trapped in the square opening No. W-34 of the second plate 23, and simultaneously therewith, the contactors 242A, 242B are respectively forced into contact with the small plate No. $X_4$ and arch plate No. $Y_3$ of the insulating plate 25. It is appreciated that the small and arch plates $X_4$ and $Y_3$ are respectively connected to LEDs f, g, b, c and a, b, g, c, d for the display of unit 4 and decimal number 3. Therefore, "34" is light for indication, thus indicating that there are 34 liters of fuel in the fuel tank. All positive poles of the LED elements are connected to a positive pole of a DC power source E, and all negative poles of the LED elements are grounded respectively through the small and arch plates X and Y.

During consumption of the fuel during the vehicle operation, the float body 71 moves downwardly, and the roller 223 and the contactors 242A, 242B move in a counterclockwise direction under the influence of the lever 72 and the bevel gears 73, 74. The indicating digital numbers are thus decreased simultaneously from "34" to "33", "32", "31" . . . Once the fuel remaining is under 10 liters, the arch plate Y is blanked; therefore, only a "unit number" is displayed. Moreover, when the fuel is completely consumed so that the tank is nearly empty, for example, when only 5 liters remain in the fuel tank, a warning means, such as a pilot lamp 81 and a buzzer 82, will be activated. Positive and negative poles of the lamp 81 and buzzer 82 are respectively connected to the positive and negative poles of DC source E and to an additional arch plate T. The additional arch plate T is positioned between the opposite ends of the first and last arch plates $Y_1$-$Y_n$, and, as shown in FIG. 3, corresponds to the small plates No. $X_o$-No. $X_5$.

It follows from the above disclosure that the contactors 242A, 242B will not contact a gap between two small plates X—X since the roller 223 will be trapped in one square opening W in each static condition of the device and, therefore, an error indication will be prevented.

It will of course be realized that various modifications can be made in the design and operation of the digital indicating system for fuel quantity of a vehicle or the like according to the invention without departing from the essential features and spirits of this disclosure, and it should be understood that within the scope of the appended claims the invention may be practiced otherwise than is specifically illustrated and described.

I claim:

1. A system for indicating the quantity of fuel in a vehicle comprising:
   a float located in a fuel tank of a vehicle;
   a shaft cooperatively connected to said float so that movement of said float causes rotation of said shaft;
   a fixed base surrounding said shaft;
   a spring assembly fixed to said shaft for rotation therewith;
   a digital readout system which includes a pair of electrical contacting elements mounted on said shaft for rotation therewith, a circular insulating plate surrounding said shaft and fixed to said base plate so that said shaft and said electrical contacting elements rotate relative to said insulating plate, a plurality of unit indicating contact plates fixed on said circular insulating plate in a circular configuration at a first radial location on said insulating plate, a plurality of decimal indicating contact plates fixed on said circular insulating plate in a circular configuration at a second radial location on said insulating plate, each one of said decimal indicating contact plates having an arcuate length corresponding to a plurality of said unit indicating contact plates, said pair of electrical contacting elements including a unit indicating contacting element located at said first radial location and in electrical contact with said unit indicating contact plates and a decimal indicating contacting element located at said second radial location and in electrical contact with said decimal indicating contact plates so that as said shaft and electrical contacting elements rotate relative to said insulating plate, said electrical contacting elements contact different ones of said unit and decimal indicating plates, and a digital display device connected to said unit and decimal indicating contact plates to display numbers having a unit component corresponding to a unit indicating plate which is in contact with said unit indicating contacting element and a decimal component corresponding to a decimal indicating plate which is in contact with said decimal indicating contacting element whereby radial position of said shaft is translated into a number so that location of said float in the vehicle fuel tank is translated into the number displayed by said display device; and
   error preventing means including a circular disc surrounding said shaft and fixed to said base and insulating plates so that said shaft rotates relative to said circular disc, said circular disc having a plurality of holes defined therein in a circular configuration at said first radial location, each hole being aligned with and having an arcuate length equal to that of one of said unit indicating contact plates so that each unit indicating contact plate is coincident with a hole in said error preventing means circular disc, a roller element mounted on said shaft for rotation therewith, said roller element being located at said first radial location to contact said holes, and biasing means on said spring assembly forcing said roller toward said holes so that as said shaft rotates said roller moves step-by-step with each step corresponding to a unit indicating contact plate whereby at any static location of said shaft said roller is entrapped in a hole thereby preventing a non-unitary location of said unit indicating contacting element and ensuring step-by-step movement of said digital readout system.

2. The system as defined in claim 1 wherein said shaft includes an upper portion having a cylindrical section and a lower portion having an ellipsoid-like section.

3. The system as defined in claim 2 wherein the spring assembly is composed of a trapezoid-like spring element having a small side and a triangular plate, a shaft which is transversely passed through the roller element so that ends of the shaft extend from respective sides of the roller, said ends being shaft tow ends, a slot defined at said trapezoid-like spring element small side for receiving the roller and two U-like supports which are formed at respective sides of said slot for supporting said shaft two ends.

4. The system as defined in claim 2 further including electrical contacting element supporting means which includes a T-like body, the T-like body being formed integrally by a disc-like portion, a first elongate portion and a second elongate portion, said electrical contacting elements being mounted adjacent to one surface of said disc-like portion, said first elongate portion having a diameter which is larger than the diameter of said second elongate portion, said circular insulating plate having a central opening defined therein with said first elongate portion diameter being slightly smaller than the diameter of the central opening of the insulating plate, the central opening of the insulating plate being larger than the diameter of said first elongate portion, said T-like body having an ellipsoid-like opening defined at a central position thereof, the first portion of the T-like body being inserted into the insulating plate central opening, said shaft ellipsoid-like portion being accommodated by said ellipsoid-like opening, said contacting element supporting means and said insulating plate being located at an upper portion of said shaft lower portion and fixed thereto.

5. The system as defined in claim 2 wherein arc length of each decimal indicating contact plate is substantially equal to the arc length of ten unit indicating contact plates, and further wherein there are gaps between said unit and decimal indicating contact plates, said gaps being equal in arc length to one another, there being a space between opposite sides of a first and a last decimal indicating contact plate.

6. The system as defined in claim 1 wherein the float includes a float-actuated mechanism which is composed of a float body, a lever and two bevel gears, the float body being located in a fuel tank, the two bevel gears being arranged to form a right angle and meshed with each other, one end of said lever being connected to the float body and another end of said lever being connected to said first bevel gear, said second bevel gear being fixed to one end of said shaft.

7. A system as defined in claim 6 wherein the float-actuated mechanism further includes a cushion means having a housing and a piston housed in the housing as well as a rod, the lever being connected to the float body and the first bevel gear being pivotably connected to said housing, the ends of the rod being respectively connected to the piston and to an outer surface of the fuel tank so that lifting or sinking of the float body will be controlled by movement of the piston relative to said housing.

8. A system as defined in claim 5 wherein the digital display device includes a plurality of LED elements, diodes and a DC source, said LED elements being divided into two sets, a suitable quantity of LED elements of a first set including numerals from "0" to "9" for indicating unit numbers, and a suitable quantity of LED elements of a second set including numerals of "0" to "9" for indicating a decimal number.

9. The system as defined in claim 8 further including a further decimal indicating contact plate located between opposite ends of said first and second decimal indicating contact plates, a pilot means and a buzzer means located in the digital display device, one pole of each of said pilot and buzzer means being commonly connected to one pole of the DC source and the other pole of each being commonly connected to a last decimal indicating contact plate, said further plate being connected to a combination of a plurality of LED elements contained in said second set LED elements, the pilot lamp and buzzer means being activated when the fuel quantity remaining in the fuel tank is lower than a predetermined quantity.

10. The system as defined in claim 9 wherein a plurality of openings are defined near the circumferences of said insulating plate, said base and said circular disc, and a plurality of sleeves are accommodated in said openings to separate said insulating plate, said base and said circular disc, and a plurality of fasteners are provided on said sleeves.

11. The system defined in claim 10 wherein said base includes a central opening and a further sleeve fixedly accommodated within said base central opening, a portion of said shaft being loosely accommodated within said further sleeve.

* * * * *